United States Patent [19]
Reed

[11] 3,835,984
[45] Sept. 17, 1974

[54] RECIPROCATING FEEDER
[76] Inventor: Alston L. Reed, 1046 Midway, Northbrook, Ill. 60062
[22] Filed: Nov. 24, 1972
[21] Appl. No.: 309,609

[52] U.S. Cl............................ 198/220 BA, 198/60
[51] Int. Cl............................................ B65g 27/00
[58] Field of Search.......... 198/53, 59, 60, 220 BA, 198/222, 58

[56] References Cited
UNITED STATES PATENTS
755,632   3/1904   Dempcy................................ 198/59
3,097,738   7/1963   Erickson................................ 198/59
FOREIGN PATENTS OR APPLICATIONS
23,799   10/1906   Great Britain........................ 198/59

Primary Examiner—James B. Marbert
Assistant Examiner—Joseph E. Valenza
Attorney, Agent, or Firm—Olson, Trexler, Wolters, Bushnell & Fosse, Ltd.

[57] ABSTRACT

A reciprocating feeder for feeding coal or the like from a hopper onto a conveyor belt. The discharge end of the reciprocating feeder is provided with a shaped plate to even out the dumping of the coal or the like onto the belt so that a more or less continuous supply of coal is provided on the belt rather than discrete piles or lumps as in the prior art.

9 Claims, 9 Drawing Figures

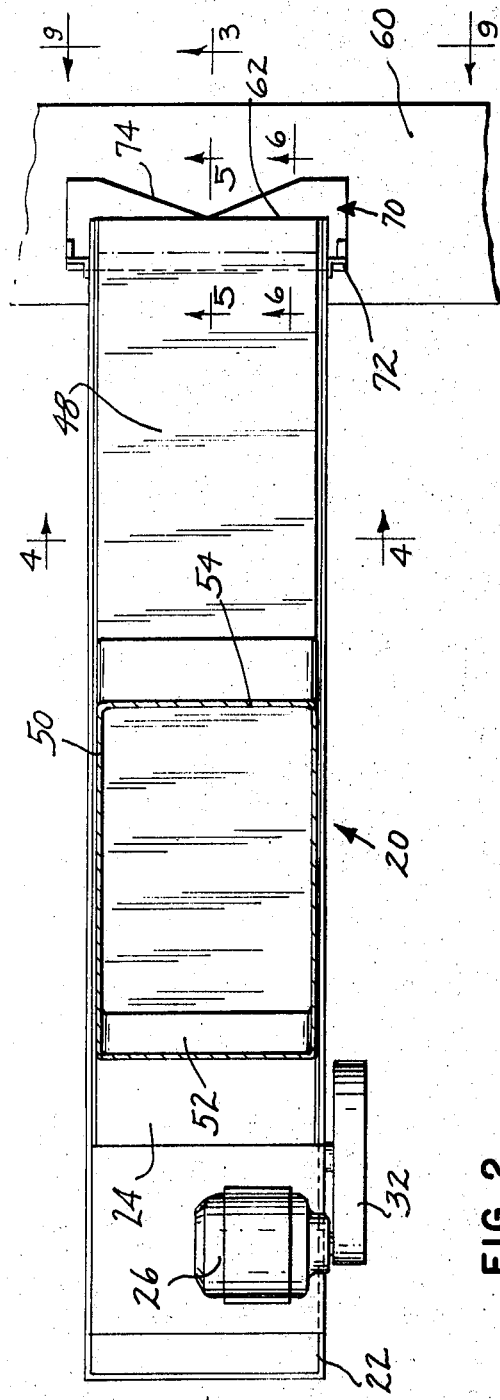
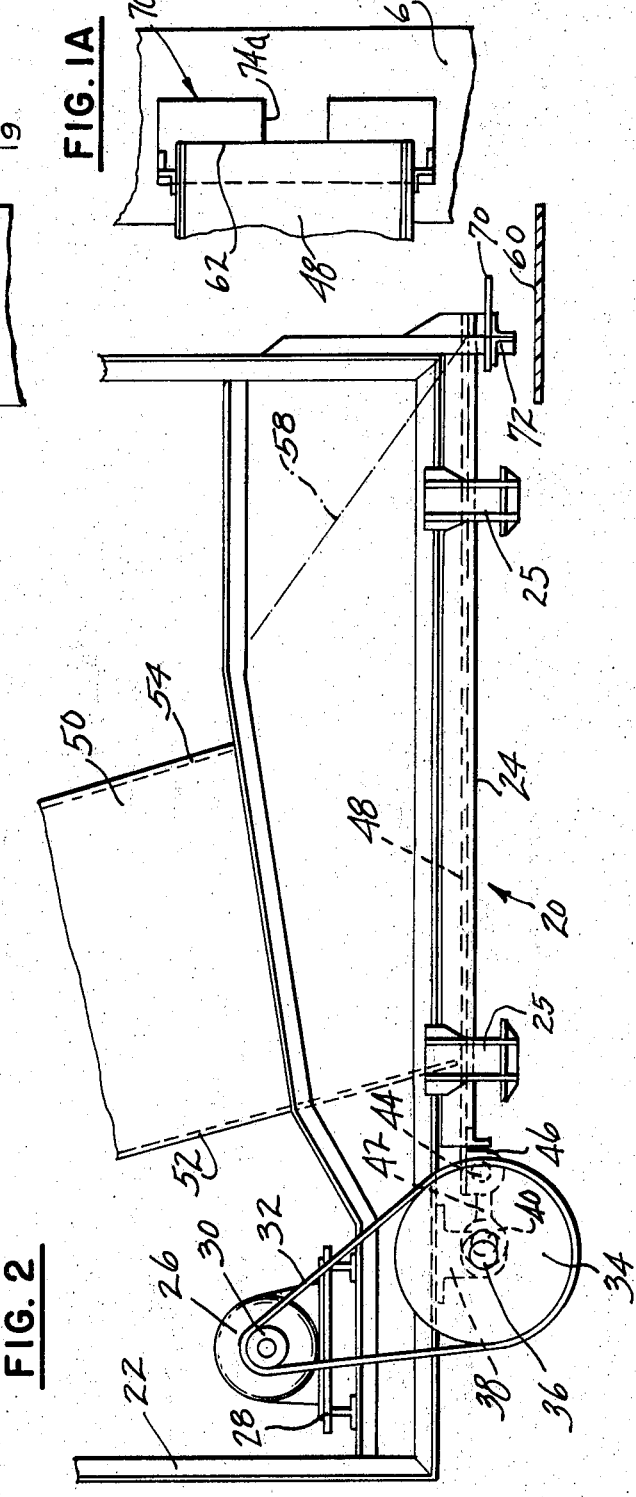

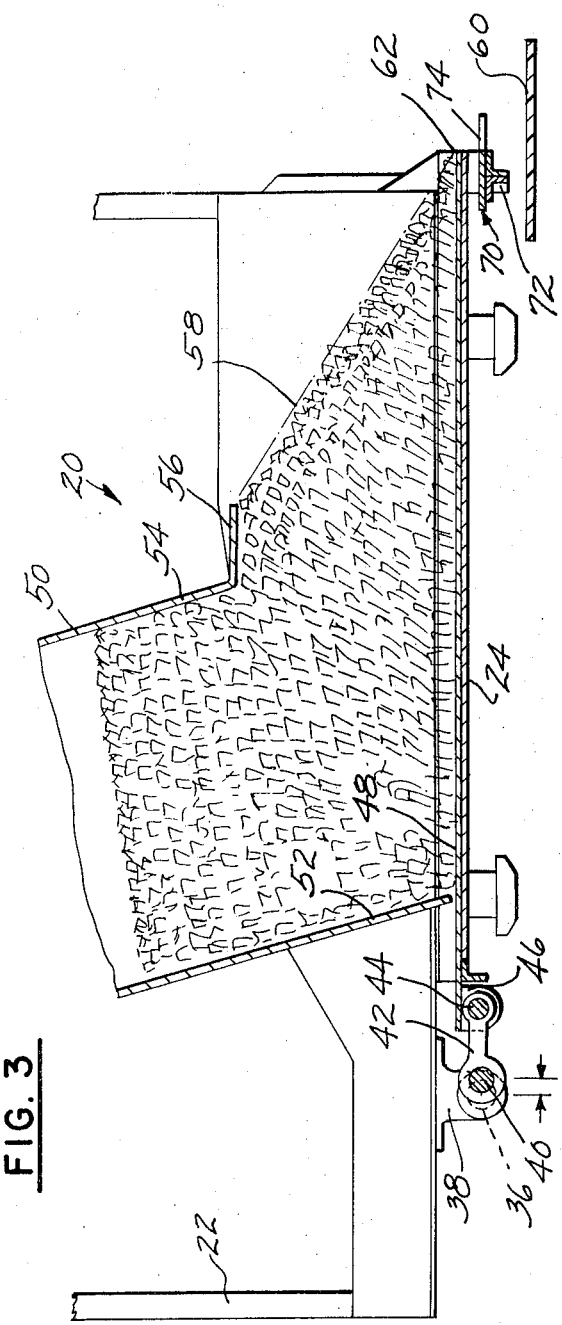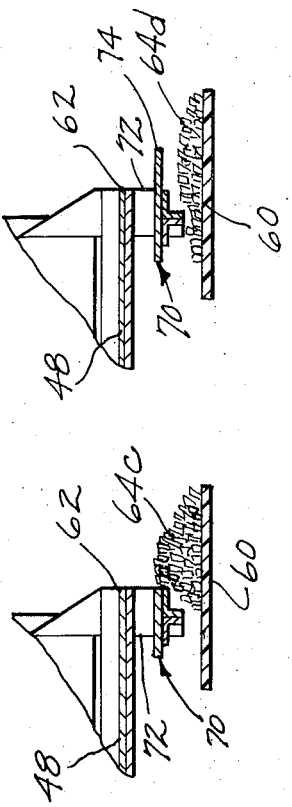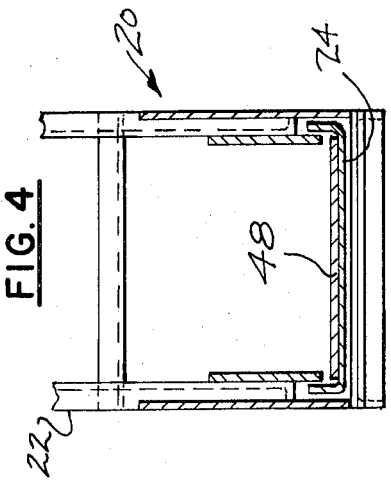

RECIPROCATING FEEDER

BACKGROUND OF THE INVENTION

Reciprocating feeders for coal and the like are well known. A plate is reciprocated back and forth a rather short distance by means such as a crank operating from an electric motor. As the plate is moved in the forward or advancing direction coal from the hopper feeds onto the back part of the plate. When the plate is subsequently moved in the reverse or backward direction the coal cannot back up, and hence coal falls off the front of the plate onto a continuously moving conveyor belt arranged generally transversely thereof. Several such feeders generally are set up to feed onto the same conveyor belt. Although such feeders are run from the same multiphase electric power line, the motors are induction motors and do not operate in synchronism relative to one another, but rather drift in and out of proper time relation. Each feeder drops a pile of coal onto the conveyor belt. Synchronization of successive reciprocating feeders is such that piles are dropped at discrete intervals, whereby to provide a substantially continuous supply of coal on the moving conveyor belt. Unfortunately, in operation it often happens that a motor will drift, whereby piles of coal from two or more successive oscillating feeders will be dropped on top of one another, rather than spread out. Accordingly, even though the total amount of coal fed onto the conveyor belt remains the same, there will be local overloads causing deleterious effects, including at least on some occasions spillage and adverse affect on equipment fed by the reciprocating conveyor. In installations wherein one reciprocating feeder supplies a conveyor belt, only a part of the capacity of the blade is used.

BRIEF STATEMENT OF THE INVENTION

The prior art reciprocating feeders are used in combination with a conveyor belt, substantially as before. However, there is an improvement in that a shaped plate is positioned at the discharge end of each feeder. In accordance with the shaping of a plate, only a part of the possible load is dropped upon retraction of the reciprocating plate. The remainder is held on the shaped plate on the discharge end, and is subsequently pushed off upon forward movement of the reciprocating plate. The result is to produce twice as many smaller piles, i.e. nearly a continuous discharge, whereby loading up of discrete piles is almost impossible.

DESCRIPTION OF THE DRAWINGS

The present invention will best be understood with reference to the following specification when taken in connection with the accompanying drawings wherein:

FIG. 1 is a top view of a reciprocating feeder and conveyor belt constructed in accordance with the principles of my present invention;

FIG. 1A is a fragmentary top view similar to a portion of FIG. 1 and illustrating a modification of the present invention;

FIG. 2 is a front view thereof;

FIG. 3 is a side view in cross section taken substantially along the ine 3—3 in FIG. 1;

FIG. 4 is a sectional view at right angles to FIG. 3 taken substantially along the line 4—4 in FIG. 1;

FIG. 5 is a detail cross sectional view showing discharge of the load onto the conveyor belt as taken in section substantially along the line 5—5 in FIG. 1;

FIG. 6 is a view similar to FIG. 5 but taken along the line 6—6 in FIG. 1;

DETAILED DESCRIPTION

Figure 7:
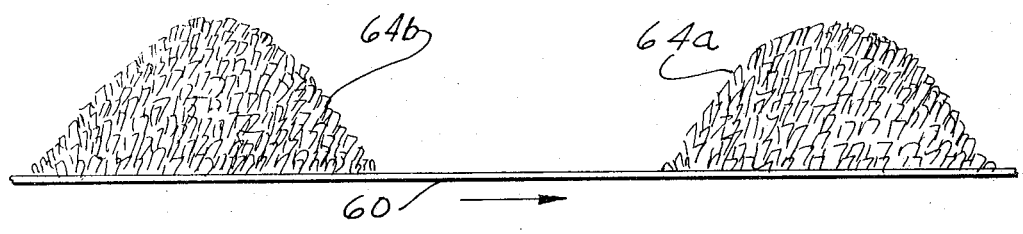
FIG. 7 is a side view of a plurality of piles of coal as dumped on a conveyor belt in accordance with the prior art.

Turning now in greater detail to the drawings, and first to FIGS. 1–4, there will be seen a feeder or loader 20 constructed in accordance with the present invention, and including a frame 22 having a channel-shaped bottom support plate or slide plate 24 supported on rollers in spaced supports 25. A multiphase electric motor 26 is mounted on a subframe 28 and acts through a drive pulley 30 and a belt 32 to drive a flywheel 34 mounted on a shaft 36 suitably supported as by pillow blocks 38 on the frame 22. The flywheel 34 is provided with a radially offset crank 40 which acts through a connecting rod 42 to shift a cross pin 44 back and forth upon rotation of the flywheel 34. The cross pin is supported by ears or flanges 46 on a wear or slide plate or feeder pan 48. The slide plate or feeder pan 48 is supported on the transverse or bottom wall of the bottom channel-shaped member 24, and the plate and channel-shaped member 24 reciprocate back and forth as a unit on the rollers in supports 25 in the direction of their lengths upon rotation of the flywheel 34, by virtue of the crank 40 and connecting link 42.

A hopper 50 has a bottom end or feed chute with a steeply inclined back wall 52 terminating immediately above the surface of the slide plate or feeder pan 48. The front wall 54 of the hopper terminates several feet above the top surface of the feeder pan, and has a right angle substantially horizontal flange 56 on the edge thereof. Coal in the hopper therefore rests on the feeder pan as shown generally in FIG. 3, having at its forward edge a substantially 35° angle of repose as indicated at 58.

A conveyor belt 60 is disposed beneath the forward edge 62. As the feeder pan moves forwardly (to the right in FIGS. 1–4) the coal shifts with it, a distance of perhaps a few inches. Subsequently, upon retrograde movement of the feeder pan, the coal cannot back up with it, due to the presence of the back wall 52. Hence, the forward edge 62 of the feeder pan retreats from beneath part of the coal, whereby to drop a pile thereof on the belt 60.

Attention should now be directed to FIG. 7 wherein there will be seen two piles of coal 64a and 64b sequentially deposited by a single reciprocating feeder in spaced relation on a conveyor belt 60 in accordance with the prior art.

Figure 8:
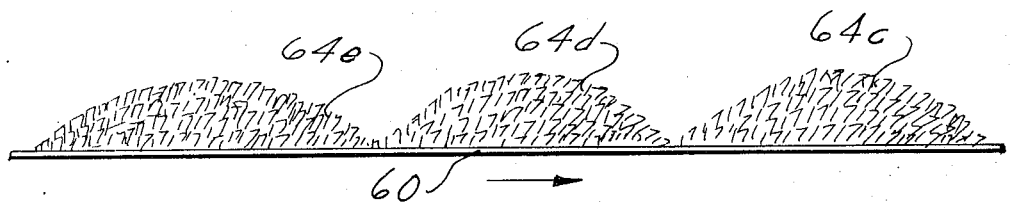
FIG. 8 is a similar side view as applied to the present invention.

Thus, in accordance with the present invention, I have provided a distributor plate 70 disposed immediately beneath the forward or discharge edge 62 of the feeder pan 48 by means of suitable supporting structure 72 depending from the main frame 22 of the machine. The distributor plate is of generally rectangular outline as seen from above in FIG. 1, but is provided at its forward or discharge end with a triangular or wide V-shaped cutout 74. When the feeder pan 48 retracts, the coal dumps from the front or discharge edge 62 thereof, but not all the coal drops direct onto the conveyor belt 60. At the longitudinally outward edges of the pan, the coal drops onto the top surface of the plate 70. At the center portion thereof, due to the cutout 74, a portion of the coal drops direct onto the top surface of the conveyor belt, while intermediate the center line and the longitudinally outer edges, part of the coal will drop onto the conveyor belt, together forming a relatively small pile as indicated at 64c in FIGS. 5 and 8. Upon the next advancing movement of the feeder pan, the coal that is supported on the plate 70 will be pushed off by the advancing feeder pan, thus to drop onto the belt 60 as an additional pile 64d (see also FIG. 6). The next succeeding retraction of the pan will deposit a pile of coal 64e, etc. The successive piles are contiguous and form a relatively uniform load on the conveyor belt. Similar principles apply as to spacing and feeding from a plurality of reciprocating feeders.

The V-shaped or triangular cutout front section 74 is given by way of illustration. As may be seen in FIG. 1A, the distributor plate 70a is provided with a central rectangular cutout 74a. Thus, all of the coal at a central location will drop straight down onto the belt 60 upon retraction of the feeder pan, and all of it received on the top surface of the distributor plate or pan 70a will be pushed off onto the belt upon advancement of the feeder pan.

It will now be apparent to those skilled in the art that I have provided a significant improvement to reciprocating feeders for coal and the like which provides for uniform distribution and prevents the prior art problem of piling up of coal in such manner as to produce local overloads, or underusing the capacity of a conveyor belt. The specific examples of the invention as herein shown and described are for illustrative purposes, and it will be apparent to those skilled in the art that various changes in structure can be made, and such changes are to be considered a part of the present invention insofar as they fall within the spirit and scope of the appended claims.

The invention is claimed as follows:

1. Feeding apparatus for solid materials such as coal comprising a feed plate mounted for reciprocating movement and having a discharge end, means operatively connected to said feed plate for reciprocating said plate back and forth in a direction toward and away from said delivery end to discharge discrete quantities of material from said discharge end, delivery means overlying said plate for delivering material thereto as from a hopper, and means providing a non-reciprocatory, substantially horizontal, fixed distributing surface underlying and extending beyond said discharge end of said feed plate in fixed position for receiving and distributing material from said plate, said distributing surface has a relieved edge thereon over which material passes, said edge being disposed away from said plate.

2. Apparatus as set forth in claim 1 wherein said edge is symmetrical about a central axis.

3. Apparatus as set forth in claim 1 and further including a conveyor belt beneath said distributing surface and receiving material therefrom.

4. Apparatus as set forth in claim 3, wherein said distributing surface has a relieved edge thereon over which material passes, said edge being disposed away from said plate and overlying said conveyor belt.

5. Apparatus as set forth in claim 4 wherein said edge is symmetrical about a central axis.

6. Apparatus as set forth in claim 4 wherein the relieved edge comprises at least one notch therein.

7. Apparatus as set forth in claim 6 wherein the notch is triangular.

8. Apparatus as set forth in claim 6 wherein the notch is rectangular.

9. Apparatus as set forth in claim 3 wherein the means providing the distributing surface comprises a plate.

* * * * *